March 30, 1965   A. J. ABODEELY   3,175,859

CONVERTIBLE TOP FOLDING COVER

Filed April 30, 1963

INVENTOR.
Alex J. Abodeely
BY
Warren H. Kurtzinger
ATTORNEY

United States Patent Office 3,175,859
Patented Mar. 30, 1965

3,175,859
CONVERTIBLE TOP FOLDING COVER
Alex J. Abodeely, 3220 1st Ave. NE., Cedar Rapids, Iowa
Filed Apr. 30, 1963, Ser. No. 277,670
13 Claims. (Cl. 296—136)

This invention relates to convertible top protection and particularly to a convertible top protective cover that will fold up and down with the top when installed.

The material of many convertible tops is difficult to clean and keep clean. Dirt, dust, soot and grime tend to work into and through the surface of many tops. This combined with the elements, of the various seasons of the year, including rain, ice, snow and both high and low temperatures each add to the damage. Some of these combinations of foreign matter and liquid are particularly corrosive and with the passage of time cause severe weathering. The hot summer sun also does its harm by tending to bake various mixtures of foreign matter right into a convertible top. Thus, convertible tops are quickly marred and top life is shortened even though convertibles are generally the most expensive line sold by automobile manufacturers. Nature is just generally harder on top fabrics and plastics than with the other parts of an automobile. Keeping a convertible comfortable can be a problem with some of the frigid weather encountered with changing seasons in various parts of the country. Further, some top colors and styling may prove unsightly for some seasons.

It is, therefore, a principal object of this invention to provide protection for prolonging useful life and maintaining attractiveness of convertible tops.

Another object is to provide for convertible top styling variation with seasonal change and for less heat loss in severely cold weather.

Features in the accomplishment of these objects include the provision of a convertible top protective cover that although fastened snugly over the top will fold with the top as the top is raised or lowered. It is a cover provided with a forward toe portion fitting over the forward end of the convertible top and framework that otherwise comes into sealing engagement with the top of the windshield frame when the top is raised. A strip of resiliently deflectable material extends along the underside of the toe portion for sealing engagement with the top of the windshield. A pane of flexible transparent material is provided at the rear of the cover for alignment with the rear window of the top. The cover is fastened in place at the rear by snaps or other fasteners which may also be used for fastening the rear of the top with some convertibles or for retractable top compartment covers. A relatively stiff, yet flexible, rib of material is inserted in a transversely extended inside cover pocket located behind the toe portion and closely spaced to the rear from the top front frame cross (header) member. This rib extends most of the width of the cover and is resiliently deflected downward at the ends by cover installation tie down to substantially eliminate cover bellowing. Cover side edge flap extensions adapt to and fit over top edges when tightened in place by elastic ribbon extensions resiliently stretched and wrapped around top frame links. Elongated clamps conforming to the top rear curved edge of rear side windows are fitted over each respective side edge rear flap portion that has been previously wrapped around the adjacent top edge portion. The ribbon extensions allow for the resilient stretching required in adapting to articulation of top frame members while maintaining a cover properly in place through repeated raising and lowering of the convertible top.

A specific embodiment representing what is presently regarded as the best mode of carrying out the invention is illustrated in the accompanying drawing.

Figure 1:
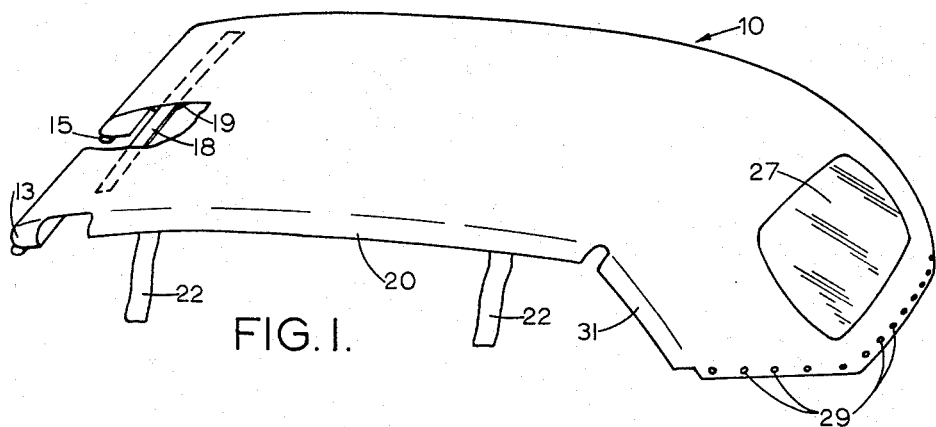
FIGURE 1 represents a perspective view of a convertible top folding cover conforming to the invention partially broken away for greater detail.
Figure 2:
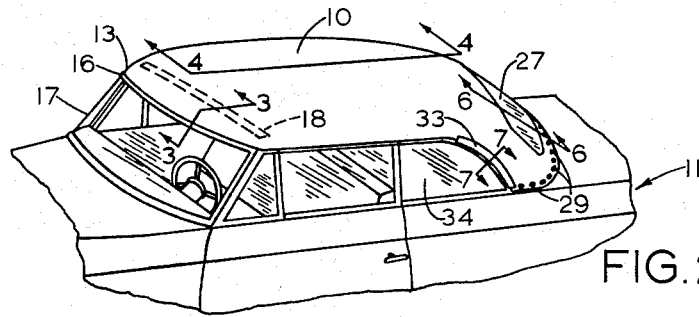
FIGURE 2 is a fragmentary perspective view of a convertible top equipped automobile with the folding cover of FIGURE 1 installed in place over the convertible top.

Referring to the drawing:

Convertible top folding cover 10, conforming to the invention as shown in FIGURE 1, and installed over the convertible top of the convertible automobile 11 of FIGURE 2, is made of a durable plastic or other suitable flexible protective material substantially impervious to moisture. The top folding cover 10 protects and beautifies existing convertible top 12, and when installed the cover 10 folds up and down right with the convertible top as it is raised and lowered. Obviously, the top folding cover 10 may be provided in both clear and color decorated plastic or artistically patterned designed covers of other material.

Figures 3, 6, 7:
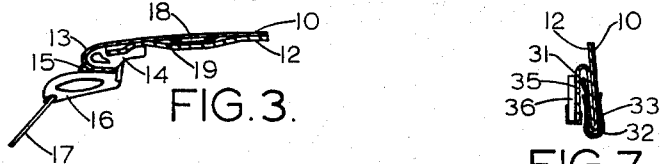
FIGURE 3 is a partial section taken on the line 3—3 of FIGURE 2 showing top cover toe header portion, windshield frame top, sealing, and cover rib detail.
FIGURE 6 is a partial section taken on line 6—6 of FIGURE 2 showing convertible top and folding cover rear window and fastening detail.
FIGURE 7 is a partial section taken on the line 7—7 of FIGURE 2 showing cover side edge rear flap portion clamping detail.

A forward toe portion 13 is provided at the front of cover 10 for a snug cup fit over the forward end header 14 portion of the convertible top 12, as shown in FIGURE 3. A resiliently deflectable sealing material strip 15 is extended along the underside of the toe portion 13 for sealing engagement with the frame top member 16 of windshield 17. This provides sealing otherwise provided between the header 14 and windshield frame top member 16 when cover 10 and toe portion 13 are not installed in place.

In order that any tendency for bellowing of cover 10 may be substantially eliminated a relatively stiff, yet flexible, rib 18 of plastic, or other suitable material, is strategically located closely behind the toe portion 13 and convertible top header 14. Rib 18 is contained in a transversely extended inside cover pocket 19 and extends most of the width of cover 10 in order that the ends are resiliently deflected downward with cover 10 fastened down snugly over top 12. Force deflecting the opposite ends of rib 18 downward holds the cover 10 snugly on top 12 right where bellowing of cover 10 is otherwise most likely to start.

Figure 4:
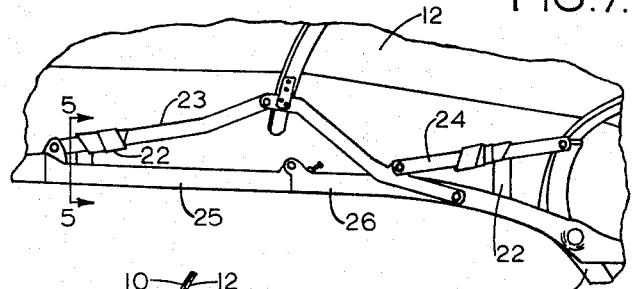
FIGURE 4 is a partial view, looking in the direction of the arrows from line 4—4 of FIGURE 2, showing convertible top side rail and top frame link detail, and cover elastic ribbon extensions resiliently stretched and wrapped around top frame links.
Figure 5:
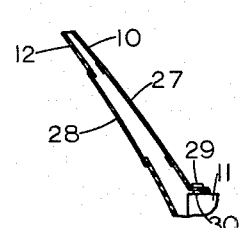
FIGURE 5 is a partial section taken on line 5—5 of FIGURE 4 showing a cover side edge flap extension folded up between the inner side of a convertible top bead side edge and a side rail, and held tightly in place with an elastic ribbon extension resiliently stretched and wrapped around a top frame link.

Side edge extension flaps 20 on opposite sides of cover 10 adapt to and fold over reinforced folded edges 21 of top 12 when tightened in place. This is accomplished when elastic ribbon extensions 22 are resiliently stretched and wrapped around top links 23 and 24 as shown in FIGURE 4. The ribbon extensions 22 are so fastened to top links 23 and 24 that, although stretched to some extent in tightening top edges 21 in place for proper cover 10 installation, there is sufficient elastic ribbon extension 22 length between flaps 20 and top links 23 and 24 to allow for resilient stretching required in adapting to articulation of top links 23 and 24 and side rails 25 and 26 while maintaining cover 10 properly in place through repeated raisings and lowerings with the convertible top. Flaps 20 fold over the respective cover edges 21 and up between the respective cover edge and side rails with the elastic ribbon extensions 22 extending for a distance from the flaps 20 to a wrapped around connection with a top link, as shown in FIGURE 5 with top link 23 and a flap 20 folded up between a cover edge 21 and a side rail 25. Folding covers for some convertible tops will employ only one elastic ribbon extension 22 for connection with a top link on each side while the folding covers for some other convertible tops may require more than two extensions 22 for connection with top links on each side.

Cover 10 is provided with a window pane 27 of flexible transparent material at the rear for alignment with rear window 28 of convertible top 12 as shown in FIGURE 6. Snap fasteners 29, of a convential nature, are provided at the rear bottom edge of cover 10 for connection with snap fastening members 30 positioned on many convertible automobiles around a convertible top storage compartment and normally used for fastening a convertible top storage compartment cover in place.

Side edge rear flap portions 31 on opposite sides of cover 10 fold over adjacent rear side top edges 32 and are held in place by elongated plastic extruded (or metal) clamps 33. Clamps 33 conform to the top rear curved edge of rear side windows 34 and in cross section are U shaped as shown in FIGURE 7. Top edges 32 are interconnected by extensions 35 to top pillars 36 of each side and move right with the pillars 36 as they are pivoted up and down during raising and lowering of the top 12. Clamps 33 and flap portions 31 may remain right in place with many convertible tops as the top is raised and lowered.

Thus, from the foregoing description it becomes apparent that a useful convertible top protective folding cover is provided that will fold up and down with the top when installed. Further, it provides for greater convertible top styling variation with seasonal change and, since there is an additional cover layer, for less heat loss in severely cold weather.

Whereas this invention is here illustrated and described with respect to a single embodiment thereof, it should be realized that various changes may be made without departing from the essential contribution to the art made by the teachings hereof.

I claim:

1. A foldable cover for an automobile convertible top, having a fabric like portion having front and rear ends and opposite edges and frame members including articulating link means associated with each side for raising and lowering of the convertible top, with the cover comprising: a sheet of material shaped to conform to the shape of the convertible top; means for fastening the front of the cover to the front of the convertible top; fastening means on the automobile adjacent to the rear of the convertible top, and fastening means at the rear edge of the cover for fastening the rear of the cover to the fastening means on the automobile; and elastic ribbon extension means at each side of said cover extended, when the cover is installed in place over a convertible top, upward within the respective side edge of the convertible top to connection with respective articulating link means with sufficient elastic ribbon extension length between the cover edge and the respective articulating link that with the elastic ribbon extension means resiliently stretched for proper cover installation the elastic ribbon extension means readily resiliently adapts to articulation of the link means while maintaining the cover properly in place through repeated raisings and lowerings of the convertible top without exceeding the resilient elastic limits of said elastic ribbon extension means.

2. The foldable cover for an automobile convertible top of claim 1, wherein the means for fastening the front of the cover includes a forward toe portion that fits over and encloses the forward end of the convertible top.

3. The foldable cover for an automobile convertible top of claim 2, including a strip of resiliently deflectable material extending along the underside of the toe portion for sealing engagement with the frame top of the windshield.

4. The foldable cover for an automobile convertible top of claim 1, wherein the fastening means on the automobile are snap fastening members and the fastening means at the rear edge of the cover are snap fasteners which fasten to the snap fastening members on the automobile; and including a window pane of flexible transparent material at the rear of the cover in alignment with a rear window of the convertible top when the cover is installed in place over a raised convertible top and with the snap fasteners of the cover fastened to the snap fastening members on the automobile.

5. The foldable cover for an automobile convertible top of claim 1, wherein the elastic ribbon extension means at each side of the cover includes multiple elastic ribbon extensions.

6. The foldable cover for an automobile convertible top of claim 1, including a relatively stiff, yet flexible, rib of material contained in a pocket of the cover, and with the rib of material and the pocket extended transversely across most of the width of the cover and closely spaced behind the front of the cover and the convertible top.

7. The foldable cover for an automobile convertible top of claim 1, further comprising extension flaps on opposite sides of the cover, with said elastic ribbon extension means fastened to and extending from said extension flaps, and with the flaps positioned to fold over respective side edges of the convertible top when tightened in place by said elastic ribbon extension means.

8. The foldable cover for an automobile convertible top of claim 7, also including cover rear side edge flap sections wrapped around adjacent rear side convertible top edge portions at rear windows of the automobile when the cover is installed in place; and elongated clamps conforming to op rear curved edges of rear side windows and of U shaped cross section fitted over respective flap sections and rear side top edge portions for holding the flap sections in place.

9. A foldable cover for an automobile convertible top, having front and rear ends and opposite side edges and frame members including articulating link means associated with each side for raising and lowering of the convertible top, with the cover comprising: a sheet of material shaped to conform to the shape of the convertible top; a forward toe portion that fits over and encloses the forward end of the convertible top; snap fastening members on the automobile closely adjacent to the rear of the convertible top, and snap fasteners at the rear edge of the cover which fasten to the snap fastening members for fastening the rear of the cover to the automobile; extension flaps on opposite sides of the cover positioned to fold over respective side edges of the convertible top when tightened in place; elastic ribbon extension means at each side of the cover extended, when the cover is installed in place over a convertible top, upward from the respective extension flaps within the respective side of the convertible top to connection with respective articulating link means, and with sufficient elastic ribbon extension length being provided between the extension flaps and the respective articulating link means for resilient adaption of the elastic ribbon extension means to articulation of the link means through repeated raisings and lowerings of the convertible top and the cover while maintaining the cover properly in place and without exceeding the resilient elastic limits of the elastic ribbon extension means; rear side edge flap sections wrapped around adjacent rear side convertible top edge portions at rear windows of the automobile when the cover is installed in place; and elongated clamps conforming to top rear edges of the rear windows and with the clamps being of U shape in cross section for fitting over respective flap sections and rear side convertible top edge portions and holding the flap sections in place.

10. The fodable cover for an automobile convertible top of claim 9, including a relatively stiff, yet flexible, rib of material contained in a pocket of the cover, and with the rib of material and the pocket extended transversely across most of the width of the cover and closely spaced behind the front of the cover and the convertible top.

11. The foldable cover for an automobile convertible top of claim 9, including a strip of resiliently deflectable material extending along the underside of the toe portion for sealing engagement with the frame top of the windshield.

12. The foldable cover for an automobile convertible top of claim 9, wherein the elastic ribbon extension means at each side of the cover includes multiple elastic ribbon extensions.

13. The foldable cover for an automobile convertible top of claim 9, wherein each connection of elastic ribbon extension means with an articulating link of the top is a wrap around connection.

References Cited by the Examiner
UNITED STATES PATENTS

| | | | |
|---|---|---|---|
| 2,382,635 | 8/45 | Humer | 296—107 |
| 2,479,825 | 8/49 | Fleischhauer | 50—1 |
| 2,764,765 | 10/56 | Woodruff. | |

FOREIGN PATENTS 1,097,263  2/55  France.

A. HARRY LEVY, *Primary Examiner.*